United States Patent
Lee et al.

(10) Patent No.: US 12,371,565 B2
(45) Date of Patent: Jul. 29, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Ji Hye Lee, Daejeon (KR); Myeung Il Kim, Daejeon (KR); Moo Seok Lee, Daejeon (KR); Jae Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 175 days.

(21) Appl. No.: 17/910,765

(22) PCT Filed: Dec. 9, 2021

(86) PCT No.: PCT/KR2021/018627
§ 371 (c)(1),
(2) Date: Sep. 9, 2022

(87) PCT Pub. No.: WO2022/124817
PCT Pub. Date: Jun. 16, 2022

(65) Prior Publication Data
US 2023/0111455 A1    Apr. 13, 2023

(30) Foreign Application Priority Data

Dec. 11, 2020   (KR) .................. 10-2020-0173178
Dec. 9, 2021    (KR) .................. 10-2021-0175415

(51) Int. Cl.
*C08L 69/00*        (2006.01)
*B29B 7/00*         (2006.01)
(Continued)

(52) U.S. Cl.
CPC ............... *C08L 69/00* (2013.01); *B29B 7/00* (2013.01); *B29C 48/022* (2019.02); *B29C 48/36* (2019.02);
(Continued)

(58) Field of Classification Search
None
See application file for complete search history.

(56) References Cited

U.S. PATENT DOCUMENTS

2013/0190425 A1*   7/2013   Zhu ................... C08L 69/00
                                                        523/451
2017/0306146 A1*  10/2017   Lee ................... C08G 64/18
2017/0321014 A1*  11/2017   Lee ................... C08L 83/10

FOREIGN PATENT DOCUMENTS

CN    102532842 A        7/2012
JP    08302154 A    *  11/1996
(Continued)

OTHER PUBLICATIONS

JP-08302154-A, Nov. 1996, machine translation (Year: 1996).*
(Continued)

*Primary Examiner* — Satya B Sastri
(74) *Attorney, Agent, or Firm* — BRYAN CAVE LEIGHTON PAISNER LLP

(57) ABSTRACT

The present invention relates to a thermoplastic resin composition, a method of preparing the same and a molded article including the same. More particularly, the thermoplastic resin composition includes a polycarbonate resin having a limited melt flow index, a polyorganosiloxane-polycarbonate resin, a vinyl cyanide compound-conjugated diene rubber-aromatic vinyl compound copolymer, a polyester resin and an epoxy group-containing copolymer in predetermined weight ratios.

12 Claims, 2 Drawing Sheets

(51) Int. Cl.
  *B29C 48/00* (2019.01)
  *B29C 48/36* (2019.01)
  *B29K 67/00* (2006.01)
  *B29K 69/00* (2006.01)
  *B29K 83/00* (2006.01)
  *C08L 55/02* (2006.01)
  *C08L 63/10* (2006.01)
  *C08L 67/03* (2006.01)

(52) U.S. Cl.
  CPC ............... *C08L 55/02* (2013.01); *C08L 63/10* (2013.01); *C08L 67/03* (2013.01); *B29K 2067/003* (2013.01); *B29K 2067/006* (2013.01); *B29K 2069/00* (2013.01); *B29K 2083/00* (2013.01); *C08L 2207/04* (2013.01)

(56) References Cited

FOREIGN PATENT DOCUMENTS

| JP | H08302154 | | 11/1996 | | |
| JP | 2019157016 | A | 9/2019 | | |
| KR | 10-0729873 | B1 | 10/2007 | | |
| KR | 10-1411009 | B1 | 6/2014 | | |
| KR | 10-2016-0016963 | A | 2/2016 | | |
| KR | 10-2016-0114084 | A | 10/2016 | | |
| KR | 10-2016-0123299 | A | 10/2016 | | |
| KR | 10-2017-0005429 | A | 1/2017 | | |
| KR | 10-1741174 | B1 | 5/2017 | | |
| KR | 10-2019-0078370 | A | 7/2019 | | |
| KR | 20190123168 | A | * 10/2019 | | |
| KR | 10-2065971 | B1 | 1/2020 | | |
| KR | 10-2020-0063887 | A | 6/2020 | | |
| KR | 10-2138701 | B1 | 7/2020 | | |
| WO | WO-9116379 | A | * 10/1991 | ............. | C08L 67/00 |

OTHER PUBLICATIONS

KR20190123168A, 2019, machine translation (Year: 2019).*
International Search Report from PCT/KR2021/018627, dated Mar. 24, 2022.
Written Opinion of the ISA from PCT/KR2021/018627, dated Mar. 24, 2022.

* cited by examiner

[FIG. 1]
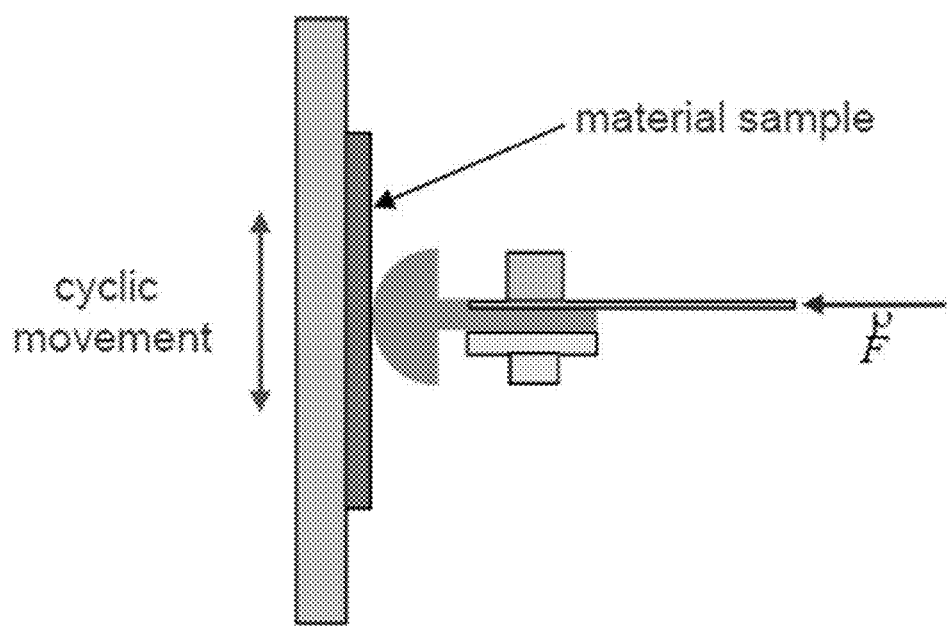

[FIG. 2]
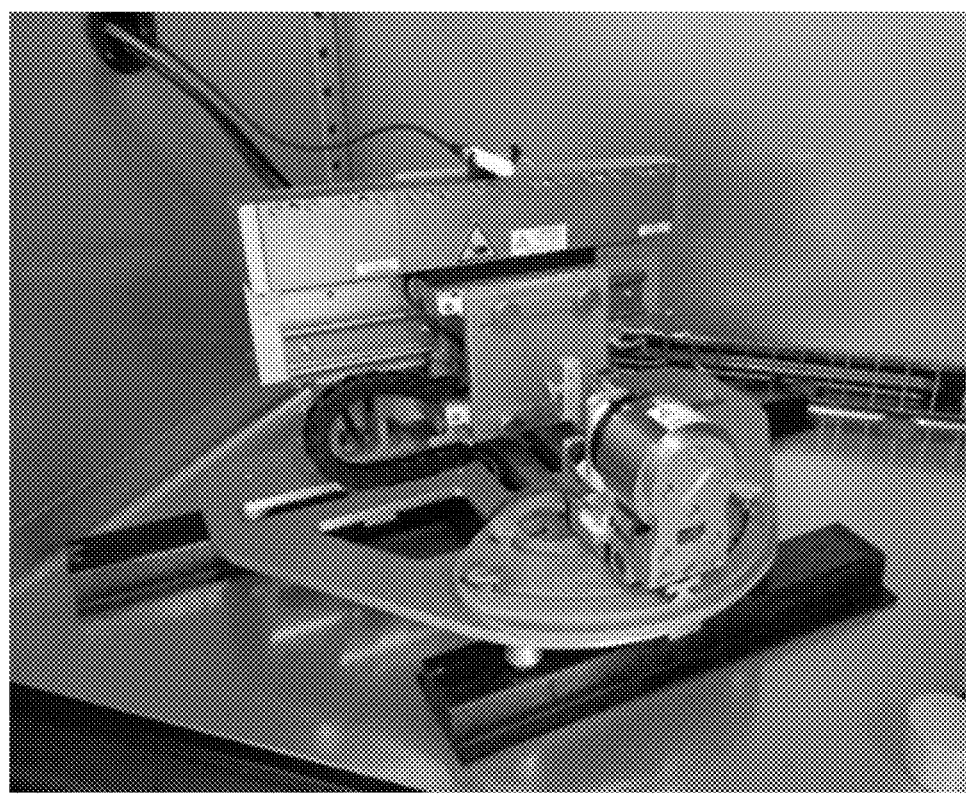

THERMOPLASTIC RESIN COMPOSITION, METHOD OF PREPARING THE SAME, AND MOLDED ARTICLE INCLUDING THE SAME

The present application is a National Phase entry pursuant to 35 U.S.C. § 371 of International Application No. PCT/KR2021/018627 filed Dec. 9, 2021, and claims priority to and the benefit of Korean Patent Application No. 10-2020-0173178, filed on Dec. 11, 2020, and Korean Patent Application No. 10-2021-0175415, filed on Dec. 9, 2021, the disclosures of each of which are incorporated herein by reference in their entirety.

FIELD

The present invention relates to a thermoplastic resin composition, a method of preparing the same and a molded article including the same, and more particularly to a thermoplastic resin composition having significantly reduced friction noise at room temperature, at low temperature, at high temperature and in a high humidity environment, while maintaining the excellent mechanical properties and heat resistance of a polycarbonate resin and a vinyl cyanide compound-conjugated diene compound-aromatic vinyl compound copolymer, and a method of preparing the thermoplastic resin composition and a molded article including the thermoplastic resin composition.

BACKGROUND

A vinyl cyanide compound-conjugated diene compound-aromatic vinyl compound copolymer (hereinafter referred to as "ABS-based resin"), represented by an acrylonitrile-butadiene-styrene resin, has excellent processability, mechanical properties, and appearance characteristics, thereby being widely used in components of electric/electronic products, automobiles, small toys, furniture, building materials, and the like. However, an ABS-based resin lacks heat resistance compared to engineering plastics, thereby having limitation in applying to components of electric/electronic products or interior materials of automobiles which require heat resistance, high strength and the like. Accordingly, an ABS-based resin is compounded with polycarbonate (PC) having excellent mechanical properties, thereby being used in the form of a PC/ABS-based alloy resin material.

The PC/ABS-based alloy resin is widely used in various applications such as automobiles and electric/electronic products due to excellent mechanical properties and its economical price. For automobile use, the PC/ABS-based alloy resin is mainly applied to interior materials, particularly is widely applied to center fascias, door trims, and the like.

However, since automobile interior materials are manufactured by assembling, fastening, and fusing respective components, vibration generated during vehicle operation causes friction between the components, thereby generating friction noise (squeak noise). Such noise is uncomfortable for drivers and passengers. In particular, since the demand for improvement of emotional quality including noise generation has been increasing in recent years, it is necessary to develop a material having low friction noise as well as high mechanical strength, molding processability and heat resistance.

[Patent Document]
KR 10-0729873 B1

SUMMARY

Therefore, the present invention has been made in view of the above problems, and it is one object of the present invention to provide a thermoplastic resin composition having excellent mechanical properties, molding processability, heat resistance and friction noise resistance.

It is another object of the present invention to provide a method of preparing the thermoplastic resin composition and a molded article manufactured using the same.

The above and other objects can be accomplished by the present invention described below.

In accordance with an aspect of the present invention, the above and other objects can be accomplished by the provision of a thermoplastic resin composition including (A) 30 to 60% by weight of a polycarbonate resin having a melt flow index (300° C., load: 1.2 kg) of 25 to 35 g/10 min measured according to ISO 1133, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin.

In accordance with another aspect of the present invention, there is provided a thermoplastic resin composition including (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a weight ratio (B:D) of the resin (B) to the resin (D) is 3:1 to 15:1.

In accordance with another aspect of the present invention, there is provided a thermoplastic resin composition including (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein the polycarbonate resin (A) has a weight average molecular weight of 10,000 to 30,000 g/mol.

In accordance with another aspect of the present invention, there is provided a thermoplastic resin composition including (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a weight ratio (B:C) of the resin (B) to the copolymer (C) is 2:1 to 4:1.

In accordance with another aspect of the present invention, there is provided a thermoplastic resin composition including (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a melt flow index (300° C., load: 1.2 kg), measured according to ISO 1133, of the polycarbonate resin (A) is 25 to 35 g/10 min, and a weight ratio (B:D) of the resin (B) to the resin (D) is 3:1 to 15:1.

In accordance with another aspect of the present invention, there is provided a thermoplastic resin composition including (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a melt flow index (300° C., load: 1.2 kg), measured according to ISO 1133, of the polycarbonate resin (A) is 25 to 35 g/10 min, and a weight ratio (B:C) of the resin (B) to the copolymer (C) is 2:1 to 4:1.

Preferably, a flexural strength, measured under conditions of 23° C., a specimen thickness of 4 mm, a span of 64 mm and a test rate of 2 mm/min, of the thermoplastic resin composition according to ISO 178 may be 78 MPa or more.

Preferably, a flexural modulus, measured under conditions of 23° C., a specimen thickness of 4 mm, a span of 64 mm and a test rate of 2 mm/min according to ISO 178, of the thermoplastic resin composition may be 2,110 MPa or more.

Preferably, a heat distortion temperature (HDT), measured under a condition of 1.8 MPa according to ISO 75, of the thermoplastic resin composition may be 95° C. or more.

Preferably, the polycarbonate resin (A) may be at least one selected from the group consisting of a linear polycarbonate resin, a branched polycarbonate resin and a polyester carbonate copolymer resin.

Preferably, the polycarbonate resin (A) may have a weight average molecular weight of 10,000 to 30,000 g/mol.

Preferably, the resin (B) may include 25 to 45% by weight of a polyorganosiloxane unit.

Preferably, a melt flow index (300° C., load: 1.2 kg), measured according to ISO 1133, of the resin (B) may be 0.5 to 4 g/10 min.

Preferably, the copolymer (C) may include a conjugated diene rubber having an average particle diameter of 0.8 to 1.5 mm.

Preferably, a conjugated diene rubber may be included in an amount of 3 to 12% by weight based on a total weight of the copolymer (C).

Preferably, the copolymer (C) may include 3 to 12% by weight of a conjugated diene rubber having an average particle diameter of 0.8 to 1.5 μM.

Preferably, a weight ratio (B:C) of the resin (B) to the copolymer (C) may be 2:1 to 4:1.

Preferably, a weight ratio (B:D) of the resin (B) to the resin (D) may be 3:1 to 15:1.

Preferably, the polyester resin (D) may be at least one selected from the group consisting of polyethylene adipate (PEA), polybutylene succinate (PBS), polyethylene terephthalate (PET), polybutylene terephthalate (PBT), polytrimethylene terephthalate (PTT) and polyethylene naphthalate (PEN).

Preferably, an intrinsic viscosity, measured under a condition of a methylene chloride solvent at 25° C., of the polyester resin (D) may be 1.0 to 1.5 dl/g.

Preferably, the thermoplastic resin composition may include an impact modifier including 40 to 60% by weight of a conjugated diene rubber and 40 to 60% by weight of a (meth)acrylate-based compound.

In accordance with another aspect of the present invention, there is provided a method of preparing a thermoplastic resin composition, the method including: kneading and extruding (A) 30 to 60% by weight of a polycarbonate resin having a melt flow index (300° C., load: 1.2 kg) of 25 to 35 g/10 min measured according to ISO 1133, (B) 25 to 50% by weight of a polyorganosiloxane-polycarbonate resin, (C) 10 to 20% by weight of a vinyl cyanide compound-conjugated diene rubber-aromatic vinyl compound copolymer (D) 1 to 10% by weight of a polyester resin and (E) 2 to 5% by weight of an epoxy group-containing resin at 200 to 280° C.

In accordance with yet another aspect of the present invention, there is provided a molded article including the thermoplastic resin composition.

As apparent from the above description, the present invention can provide a thermoplastic resin composition exhibiting significantly improved friction noise reduction effect at room temperature, at low temperature, and in a high humidity and high temperature environments, i.e., being capable of providing excellent emotional quality in wide temperature and humidity ranges, while having excellent mechanical strength, molding processability and heat resistance; a method of preparing the thermoplastic resin composition; and a molded article manufactured by the method.

BRIEF DESCRIPTION OF THE DRAWINGS

FIG. 1 schematically illustrates a stick-slip noise measurement method of the present disclosure.

FIG. 2 illustrates a stick-slip noise measuring device used to measure stick-slip noise according to the present disclosure.

DETAILED DESCRIPTION

Hereinafter, a thermoplastic resin composition of the present disclosure, a method of preparing the same and a molded article manufactured using the thermoplastic resin composition are described in detail.

The present inventors confirmed that friction noise resistance at room temperature, at low temperature, and in a high humidity and high temperature environment as well as mechanical strength, molding processability and heat resistance are significantly improved by adjusting the melt flow index of a polycarbonate resin included in a PC/ABS-based alloy resin and including a polyorganosiloxane-polycarbonate resin, a polyester resin and an epoxy group-containing resin in predetermined weight ratios. Based on the results, the present inventors conducted further studies to complete the present invention.

A thermoplastic resin composition of the present invention includes (A) 30 to 60% by weight of a polycarbonate resin having a melt flow index (300° C., load: 1.2 kg) of 25 to 35 g/10 min measured according to ISO 1133, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin. In this case, mechanical properties, molding processability and heat resistance are excellent, particularly excellent friction noise resistance is exhibited in wide temperature and humidity ranges.

As another embodiment, the thermoplastic resin composition of the present invention includes (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a weight ratio (B:D) of the resin (B) to the resin (D) is 3:1 to 15:1. In this case, mechanical properties, molding processability and heat resistance are excellent, particularly excellent friction noise resistance is exhibited in wide temperature and humidity ranges.

As another embodiment, the thermoplastic resin composition of the present invention includes (A) 30 to 60% by weight of a polycarbonate resin, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin, wherein a weight ratio (B:C) of the resin (B) to the copolymer (C) is 2:1 to 4:1. In this case, mechanical properties, molding processability and heat resistance are excellent, particularly excellent friction noise resistance is exhibited in wide temperature range and humidity ranges.

In this disclosure, the composition ratio of a copolymer or a resin may mean the content of units constituting the copolymer, or may mean the content of units input during polymerization of the copolymer.

In this disclosure, "content" means "% by weight" unless otherwise defined.

Hereinafter, each component constituting the thermoplastic resin composition of the present disclosure is described in detail.

(A) Polycarbonate Resin

The polycarbonate resin (A) may be included in an amount of 30 to 60% by weight, preferably 33 to 55% by weight, more preferably 35 to 50% by weight, based on 100% by weight in total of the thermoplastic resin composition. In this case, excellent molding processability and mechanical rigidity are exhibited without deterioration of other physical properties.

In this disclosure, "100% by weight in total of the thermoplastic resin composition" means that a total weight of the sum of the polycarbonate resin (A) to the epoxy group-containing resin (E) is 100% by weight when an impact modifier (F) is not included and that a total weight of the sum of the polycarbonate resin (A) to the impact modifier (F) is 100% by weight when the impact modifier (F) is included.

A melt flow index (300° C., 1.2 kg), measured according to ISO 1133, of the polycarbonate resin (A) may be 25 to 35 g/10 min, preferably 27 to 35 g/10 min, more preferably 28 to 34 g/10 min. Within these ranges, molding processability and friction noise resistance are excellent.

The type of the polycarbonate resin (A) is not particularly limited, and may be, for example, a resin prepared by polymerizing a bisphenol-based monomer and a carbonate precursor.

The bisphenol-based monomer may be, for example, at least one selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A; BPA), 2,2-bis(4-hydroxyphenyl)butane, 1,1-bis(4-hydroxyphenyl)cyclohexane (bisphenol Z; BPZ), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane and α,ω-bis[3-(o-hydroxyphenyl)propyl]polydimethylsiloxane.

The carbonate precursor may be, for example, at least one selected from the group consisting of dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, bis(diphenyl) carbonate, carbonyl chloride (phosgene), triphosgene, diphosgene, carbonyl bromide and bishaloformate.

The polycarbonate resin (A) may be, for example, at least one selected from the group consisting of a linear polycarbonate resin, a branched polycarbonate resin and a polyester carbonate copolymer resin, preferably a linear polycarbonate resin. In this case, fluidity is improved so that excellent molding processability and appearance characteristics are provided.

As a preferred example, the linear polycarbonate resin may be a bisphenol-A-based polycarbonate resin.

The polycarbonate resin (A) may have a weight average molecular weight of, for example, 10,000 to 30,000 g/mol, preferably 10,000 to 20,000 g/mol, more preferably 12,000 to 19,000 g/mol. Within these ranges, physical property balance is excellent.

In the present disclosure, a weight average molecular weight may be measured using tetrahydrofuran (THF) as an eluate and using a gel permeation chromatograph (GPC) filled with porous silica as a column packing material, unless defined otherwise. In this case, weight average molecular weight may be obtained as a relative value to a polystyrene (PS) standard sample. Specific measurement conditions are as follows: solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

Izod impact strength, measured at 23° C. under a thickness condition of ⅛" according to ASTM D256, of the polycarbonate resin (A) may be, for example, 60 kg·cm/cm or more, preferably 60 to 80 kg·cm/cm. Within these ranges, excellent mechanical properties are exhibited without deterioration of other physical properties.

A method of preparing the polycarbonate resin (A) is not specifically limited so long as it is a preparation method commonly applied in this technical field, and commercially available products may be used within the scope of the present invention.

(B) Polyorganosiloxane-Polycarbonate Resin

The polyorganosiloxane-polycarbonate resin (B) (hereinafter referred to as "resin (B)") may be included in an amount of 25 to 50% by weight, preferably 25 to 45% by weight, more preferably 25 to 40% by weight, based on 100% by weight in total of the thermoplastic resin composition. In this case, mechanical properties, molding processability and heat resistance are excellent, and excellent friction noise resistance is exhibited in wide temperature and humidity ranges.

In the present disclosure, the polyorganosiloxane-polycarbonate copolymer is distinguished from the polycarbonate resin (A) in that the polyorganosiloxane-polycarbonate copolymer includes polyorganosiloxane introduced into a polycarbonate main chain. That is, the polycarbonate resin (A) may be expressed as "polycarbonate resin (A) (not containing polyorganosiloxane)" as needed.

The resin (B) may include, for example, 25 to 45% by weight, preferably 25 to 40% by weight, more preferably 28 to 40% by weight, even more preferably 28 to 35% by weight, even more preferably 30 to 35% by weight, of a polyorganosiloxane unit. Within these ranges, friction noise resistance and physical property balance are excellent.

The polyorganosiloxane unit may be derived from, for example, one or more selected from the group consisting of polydimethylsiloxane, polydiethylsiloxane, polydipropylsiloxane, polydibutylsiloxane and polydipentylsiloxane, preferably may be derived from olydimethylsiloxane. In this case, mechanical strength and physical property balance are excellent.

The polycarbonate unit included in the resin (B) may be appropriately selected within the same range as those mentioned regarding the polycarbonate (A).

The melt flow index (300° C., load: 1.2 kg), measured according to ISO 1133, of the resin (B) may be, for example, 0.5 to 4 g/10 min, preferably 0.7 to 3 g/10 min, more preferably 0.7 to 1.5 g/10 min. Within these ranges, friction noise resistance and physical property balance are excellent.

The resin (B) may have a weight average molecular weight of, for example, 40,000 to 160,000 g/mol, preferably 45,000 to 150,000 g/mol, more preferably 50,000 to 100,000 g/mol. Within these ranges, friction noise resistance and physical property balance are excellent.

A method of preparing the resin (B) is not specifically limited so long as it is a preparation method commonly applied in this technical field, and commercially available products may be used within the scope of the present invention.

(C) Vinyl Cyanide Compound-Conjugated Diene Rubber-Aromatic Vinyl Compound Copolymer The vinyl cyanide compound-conjugated diene rubber-aromatic vinyl compound copolymer (C) (hereinafter referred to as "copolymer (C)") may be included in an amount of 10 to 20% by weight, preferably 12 to 20% by weight, more preferably 15 to 20% by weight, based on 100% by weight in total of the thermoplastic resin composition. Within these ranges, mechanical properties, molding processability and physical property balance are excellent. As a preferred example, the copolymer (C) may be included in an amount of 13 to 18% by weight, more preferably 15 to 17% by weight. Within these ranges, molding processability and flexural characteristics are excellent.

A conjugated diene rubber included in the copolymer (C) may have an average particle diameter of, for example, 0.8 to 1.5 μm, preferably 1.0 to 1.3 μm. In this case, mechanical properties, molding processability and physical property balance are excellent.

In the present disclosure, the average particle diameter of the conjugated diene rubber may be measured by dynamic light scattering, and specifically, may be measured as an intensity value using a sample in the form of latex and using a particle size analyzer (Nicomp CW380, PPS Co.) in a Gaussian mode. More specifically, 0.1 g of latex having a solids content of 35 to 50% by weight is diluted with 100 g of deionized water to prepare a sample, and the DLS average particle diameter of the sample is measured at 23° C. using a particle size analyzer (Nicomp CW380, PPS Co.) in a measurement method using auto-dilution and flow cells, and in a measurement mode of dynamic light scattering/intensity 300 kHz/intensity-weight Gaussian analysis.

The conjugated diene rubber of the copolymer (C) may be included in an amount of, for example, 3 to 12% by weight, preferably 5 to 12% by weight, more preferably 5 to 10% by weight, based on a total weight of the copolymer (C). In this case, the balance between mechanical properties and molding processability is excellent.

The copolymer (C) may be preferably a graft copolymer prepared by graft-polymerizing 3 to 12% by weight of a conjugated diene rubber, 15 to 40% by weight of a vinyl cyanide compound and 50 to 75% by weight of an aromatic vinyl compound, more preferably a graft copolymer prepared by graft-polymerizing 5 to 12% by weight of a conjugated diene rubber, 15 to 35% by weight of a vinyl cyanide compound and 55 to 75% by weight of an aromatic vinyl compound, even more preferably a graft copolymer prepared by graft-polymerizing 5 to 10% by weight of a conjugated diene rubber, 20 to 35% by weight of a vinyl cyanide compound and 55 to 70% by weight of an aromatic vinyl compound, based on a total weight of the copolymer (C). In this case, mechanical properties and molding processability are excellent.

The copolymer (C) may have a grafting degree of, for example, 20 to 50%, preferably 20 to 45%, more preferably 25 to 45%. Within these ranges, compatibility and molding processability may be appropriately secured and balance between the properties and other mechanical properties is excellent.

In the present disclosure, when measuring grafting degree, 30 g of acetone is added to 0.5 g of a powdered graft polymer, agitation is performed at 210 rpm and room temperature for 12 hours using a shaker (SKC-6075, Lab Companion Co.), centrifuging is performed at 18,000 rpm and 0° C. for 3 hours using a centrifuge (Supra R30, Hanil Science Co.) to separate only insoluble matter that is not dissolved in acetone, and the separated insoluble matter is dried via forced circulation at 85° C. for 12 hours using a forced convection oven (OF-12GW, Lab Companion Co.). Then, the weight of the dried insoluble matter is measured, and grafting degree is calculated by Equation 1 below.

Grafting degree (%)=[Weight (g) of grafted monomers (g)/Weight (g) of rubber (g)]*100    [Equation 1]

In Equation 1, the weight of grafted monomers is a value obtained by subtracting the weight (g) of rubber from the weight of insoluble matter (gel) obtained by dissolving a graft copolymer in acetone and performing centrifuging, and the weight (g) of rubber is the weight of rubber components theoretically included in the graft copolymer powder.

The copolymer (C) may have a weight average molecular weight of, for example, 100,000 to 1,000,000 g/mol, preferably 200,000 to 900,000 g/mol, more preferably 230,000 to 500,000 g/mol. Within these ranges, fluidity is appropriate, and thus, processability and impact resistance are excellent.

The conjugated diene rubber may include, for example, a conjugated diene compound.

The conjugated diene compound may be, for example, one or more selected from the group consisting of 1,3-butadiene, 2,3-dimethyl-1,3-butadiene, 2-ethyl-1,3-butadiene, 1,3-pentadiene, isoprene, and chloroprene, preferably 1,3-butadiene.

The vinyl cyanide compound may be, for example, one or more selected from the group consisting of acrylonitrile, methacrylonitrile, ethylacrylonitrile and isopropylacrylonitrile, preferably acrylonitrile.

The aromatic vinyl compound may be, for example, at least one selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chlorostyrene, p-chloro styrene, m-chlorostyrene, vinyltoluene, vinylxylene, fluorostyrene, and vinylnaphthalene, preferably at least one selected from the group consisting of styrene and α-methyl styrene, even more preferably styrene. In this case, fluidity is appropriate so that processability is excellent and mechanical properties such as impact resistance are excellent.

The copolymer (C) may be prepared, for example, by a known preparation method including emulsion polymerization, suspension polymerization, and bulk polymerization, preferably emulsion polymerization. As the copolymer (C), commercially available products may be used within the scope of the present invention.

(D) Polyester Resin

The polyester resin (D) may be included in an amount of 1 to 10% by weight, preferably 2 to 8% by weight, more preferably 3 to 7% by weight, based on 100% by weight in total of the thermoplastic resin composition. In this case, molding processability is excellent and friction noise resistance is excellent in wide temperature and humidity ranges, without deterioration of other physical properties.

The intrinsic viscosity, measured under conditions of 25° C. and a methylene chloride solvent, of the polyester resin (D) may be, for example, 1.0 to 1.5 dl/g, preferably 1.0 to 1.3 dl/g, more preferably 1.0 to 1.2 dl/g. Within these ranges, mechanical properties and processability are further improved.

In the present disclosure, when intrinsic viscosity is measured, unless noted otherwise, a sample to be measured is completely dissolved at a concentration of 0.05 g/ml in a methylene chloride solvent, and then is filtered using a filter to obtain a filtrate. Then, using the obtained filtrate, intrinsic viscosity is measured at 25° C. using a Ubbelohde viscometer.

The polyester resin (D) may be, for example, one or more selected from the group consisting of polyethylene adipate (PEA), polybutylene succinate (PBS), polyethylene terephthalate (PET), polybutylene terephthalate (PBT), polytrimethylene terephthalate (PTT) and polyethylene naphthalate (PEN), preferably one or more selected from the group consisting of polyethylene terephthalate and polybutylene terephthalate, more preferably polybutylene terephthalate. In this case, the composition exhibits satisfactory mechanical properties and molding processability, excellent physical property balance, and excellent friction noise resistance in a wide temperature range and humidity range.

The polyester resin (D) may be prepared using, for example, a polymerized copolymer including at least one selected from the group consisting of polytetramethylene glycol (PTMG), polyethylene glycol (PEG), polypropylene glycol (PPG) and low-molecular-weight aliphatic polyamide. In this case, mechanical properties is further improved.

A method of preparing the polyester resin (D) is not specifically limited so long as it is a preparation method commonly applied in this technical field, and commercially available products may be used within the scope of the present invention.

(E) Epoxy Group-Containing Resin

The epoxy group-containing resin (E) may be included in an amount of 2 to 5% by weight, based on 100% by weight in total of the thermoplastic resin composition. Within these ranges, excellent molding processability and friction noise resistance are exhibited without deterioration of other physical properties.

The epoxy group-containing resin (E) may be included, for example, in an amount of preferably 2 to 3.8% by weight, more preferably 2 to 3.5% by weight, based on 100% by weight in total of the thermoplastic resin composition. In this case, molding processability and mechanical rigidity are further improved.

The epoxy group-containing resin (E) may include, for example, a glycidyl compound, preferably may include at least one selected from the group consisting of an olefin-based compound, vinyl acetate and an alkyl acrylate-based compound, together with the glycidyl compound. In this case, physical property balance and friction noise resistance are further improved.

The epoxy group-containing resin (E) may include more preferably 5 to 25% by weight of a glycidyl compound, 1 to 10% by weight of an unsaturated acetate compound, and 70 to 90% by weight of an olefin-based compound, even more preferably 10 to 20% by weight of a glycidyl compound, 1 to 7% by weight of an unsaturated acetate compound, and 75 to 85% by weight of an olefin-based compound. In this case, physical property balance and friction noise resistance are further improved.

The glycidyl compound may be preferably glycidyl (meth)acrylate.

The unsaturated acetate compound may be, for example, an acetate compound including an alkenyl group having 2 to 5 carbon atoms, preferably vinyl acetate.

The olefin-based compound may be, for example, an alkene having 2 to 5 carbon atoms, preferably at least one selected from the group consisting of ethylene and propylene.

The alkyl acrylate-based compound may be, for example, one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate and lauryl acrylate, preferably n-butylacrylate or 2-ethylhexyl acrylate.

In the present disclosure, the alkyl (meth)acrylate may be determined to include both alkyl acrylate and alkyl methacrylate.

As a preferred example, the epoxy group-containing resin (E) may be an ethylene-glycidyl methacrylate copolymer grafted with vinyl acetate. In this case, physical property balance is further improved.

The epoxy group-containing resin (E) may further include, for example, maleic acid or maleic anhydride. In this case, heat resistance and physical property balance are further improved.

A method of preparing the epoxy group-containing resin (E) is not specifically limited so long as it is a preparation method commonly applied in this technical field, and commercially available products may be used within the scope of the present invention.

(F) Impact Modifier

The thermoplastic resin composition may include optionally the impact modifier (F). In this case, excellent mechanical properties are exhibited without deterioration of other physical properties.

The impact modifier (F) may be included in an amount of, for example, 1 to 3.3% by weight, preferably 2 to 3% by weight, more preferably 2.5 to 3% by weight, based on 100% by weight in total of the thermoplastic resin composition (from the polycarbonate resin (A) to the impact modifier (F)). Within these ranges, excellent mechanical properties are exhibited without deterioration of other physical properties.

The impact modifier (F) may include, for example, a conjugated diene rubber and a (meth)acrylate-based compound. Based on 100% by weight in total of the conjugated diene rubber and (meth)acrylate-based compound included in the impact modifier (F), preferably 30 to 70% by weight of a conjugated diene rubber and 30 to 70% by weight of a (meth)acrylate-based compound, more preferably 50 to 70% by weight of a conjugated diene rubber and 30 to 50% by weight of a (meth)acrylate-based compound, may be included. In this case, mechanical properties and physical property balance are further improved.

The conjugated diene rubber may be appropriately selected within the same range as those mentioned regarding the copolymer (C).

The (meth)acrylate-based compound may be, for example, at least one selected from the group consisting of methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate and decyl (meth)acrylate, preferably methyl methacrylate.

In the present disclosure, the (meth)acrylate-based compound indicates a range including both an methacrylate-based compound and an acrylate-based compound.

The impact modifier (F) may further include, for example, an aromatic vinyl compound. The aromatic vinyl compound may be appropriately selected within the same range as those mentioned regarding the copolymer (C).

A method of preparing the impact modifier (F) is not specifically limited so long as it is a preparation method commonly applied in this technical field, and commercially available products may be used within the scope of the present invention.

Thermoplastic Resin Composition

The thermoplastic resin composition of the present invention may include (A) 30 to 60% by weight of a polycarbonate resin having a melt flow index (300° C., load: 1.2 kg) of 25 to 35 g/10 min measured according to ISO 1133, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin. In this case, mechanical strength, molding processability and heat resistance are excellent. In particular, friction noise resistance is excellent in wide temperature and humidity ranges.

A weight ratio (B:D) of the resin (B) to the resin (D) included in the thermoplastic resin composition may be, for example, 3:1 to 15:1, preferably 3:1 to 14:1, more preferably 3:1 to 13.5:1. In this case, friction noise resistance is further improved in wide temperature and humidity ranges without deterioration of other physical properties.

A weight ratio (B:C) of the resin (B) to the copolymer (C) included in the thermoplastic resin composition may be, for example, 2:1 to 4:1, preferably 2:1 to 3:1, more preferably 2:1 to 2.5:1. In this case, friction noise resistance is further improved in a wide temperature range and humidity range without deterioration of other physical properties.

The flexural strength, measured under conditions of 23° C., a specimen thickness of 4 mm, a span of 64 mm and a test rate of 2 mm/min according to ISO 178, of the thermoplastic resin composition may be, for example, 71 MPa or more, or 78 MPa or more, preferably 78 to 90 MPa, more preferably 78 to 85 MPa. Within these ranges, mechanical properties and physical property balance are excellent.

The flexural modulus, measured under conditions of 23° C., a specimen thickness of 4 mm, a span of 64 mm and a test rate of 2 mm/min according to ISO 178, of the thermoplastic resin composition may be, for example, 1,900 MPa or more, or 2,110 MPa or more, preferably 2,110 to 2,300 MPa, more preferably 2,110 to 2,200 MPa. Within these ranges, mechanical properties and physical property balance are excellent.

The stick-slip noise, measured under conditions of 23° C. and a relative humidity of 50% according to Verband Der Automobilindustrie e.v. (VDA) 230-206, of the thermoplastic resin composition may be, for example, 3 grades or less, preferably 1 to 3 grades, more preferably 1 to 2 grades. Within these ranges, room-temperature friction noise resistance and physical property balance are excellent.

The stick-slip noise, measured under conditions of −25° C. and a relative humidity of 50% according to VDA 230-206, of the thermoplastic resin composition may be, for example, 3 grades or less, preferably 1 to 3 grades, more preferably 1 to 2 grades. Within these ranges, low-temperature friction noise resistance and physical property balance are excellent.

The stick-slip noise, measured under conditions of 75° C. and a relative humidity of 50% according to VDA 230-206, of the thermoplastic resin composition may be, for example, 3 grades or less, preferably 1 to 3 grades, more preferably 1 to 2 grades. Within these ranges, high-temperature friction noise resistance and physical property balance are excellent.

The stick-slip noise, measured under conditions of 50° C. and a relative humidity of 90% according to VDA 230-206, of the thermoplastic resin composition may be, for example, 3 grades or less, preferably 1 to 3 grades, more preferably 1 to 2 grades. Within these ranges, medium-temperature and high-humidity friction noise resistance, and physical property balance are excellent.

In the present disclosure, a relative humidity represents a ratio (%) of water vapor pressure to saturated water vapor pressure at a given temperature, and may be measured using a method known in the related field for measuring a relative humidity. For example, a commercially available hygrometer may be used.

The accompanying FIGS. 1 and 2 respectively illustrate a measurement method and device used to measure stick-slip noise in examples and comparative examples of the present invention.

As a particular example of measuring stick-slip noise according to VDA 230-206, using the Ziegler SSP-04 equipment, a flat plate specimen of 100 mm×100 mm×30 mm in width, length and thickness is fixed on a movable fixing plate, which reciprocates left and right, and a flat specimen of 25 mm×50 mm×30 mm in width, length and thickness is fixed to an upper fixing plate equipped with a spring. Next, the centers of the two specimens are adjusted to coincide with each other and, in a state in which the two specimens are in contact, acceleration, impulse, frequency, friction, and fluctuation are respectively measured under four loads (i.e., contact force applied to the two specimens) and motion velocity conditions of (10 N, 1 mm/s), (10 N, 4 mm/s), (40 N, 1 mm/s) and (40 N, 4 mm/s). Dynamic and static friction coefficients are obtained from the measurement results and may be calculated as a RPN (Risk Priority Number) value according to Equation 2 below.

$$RPN = \frac{2 * \text{grade}_{energie\_rate} + \text{grade}_{impulse\_rate} + \text{grade}_{acceleration}}{4} \quad \text{[Equation 2]}$$

In Equation 2, $\text{grade}_{energie\_rate}$ denotes kinetic energy, $\text{grade}_{impulse\_rate}$ denotes the number of impulses within 1 mm of displacement amount, and $\text{grade}_{acceleration}$ denotes a maximum vibration value.

<Friction Noise Property Evaluation>
RPN 1 to 3: Good (the possibility of friction noise is very low)
RPN 4 to 5: Partially good
RPN 6 to 10: Not good In the present disclosure, stick-slip noise is related to buzz, squeak, and rattle (BSR) generated in a vehicle and BSR are properties associated with aesthetics. Stick-slip noise occurs at the assembly seam, joint, or friction area of a system, and is also called noise. Here, buzz is caused by structural vibration and is a drum-like noise generated alone from the panel of a part, squeak is a noise generated by friction between parts in a shear direction, and rattle is a noise generated by vertical collision between parts.

As a preferred example, all of the stick-slip noise values, measured according to VDA 230-206 in a temperature range of −25 to 75° C. and a relative humidity range of 50 to 90%, of the thermoplastic resin composition of the present invention are satisfactory 3 grades or less, so that a molded article having excellent friction noise resistance in a wide temperature range and humidity range may be provided. For example, when applied as an automobile interior material, high emotional quality may be realized regardless of temperature and rainfall environments.

The melt flow index (260° C., load: 5 kg), measured according to ISO 1133, of the thermoplastic resin composition may be, for example, 10 g/10 min or more, preferably 10 to 30 g/10 min, more preferably 13 to 25 g/10 min. Within these ranges, molding processability is further improved without deterioration of other physical properties.

The heat distortion temperature (HDT), measured under a condition of 1.8 MPa according to ISO 75, of the thermoplastic resin composition may be, for example, 95° C. or more, preferably 95 to 120° C., more preferably 96 to 110° C. Within these ranges, heat resistance is further improved without deterioration of other physical properties. In particular, the thermoplastic resin composition is suitable for use as a material for automobiles.

Method of Preparing Thermoplastic Resin Composition

A method of preparing the thermoplastic resin composition of the present invention includes a step of kneading and extruding (A) 30 to 60% by weight of a polycarbonate resin having a melt flow index (300° C., load: 1.2 kg) of 25 to 35 g/10 min measured according to ISO 1133, (B) 25 to 50% by weight of a polyorganosiloxane-polycarbonate resin, (C) 10 to 20% by weight of a vinyl cyanide compound-conjugated diene rubber-aromatic vinyl compound copolymer, (D) 1 to 10% by weight of a polyester resin and (E) 2 to 5% by weight of an epoxy group-containing resin at 200 to 300° C. In this case, all of mechanical properties, molding processability, heat resistance and friction noise resistance are excellent.

In the kneading and extrusion step, temperature and a screw rotation speed of an extruder may be respectively, for example, 200 to 300° C. and 200 to 350 rpm, preferably 220 to 280° C. and 240 to 300 rpm. In this case, mechanical properties, chemical resistance, heat resistance and appearance quality are excellent.

The kneading and extrusion step may be performed, for example, using one or more selected from a group consisting of a single-screw extruder, a twin-screw extruder, and a Banbury mixer. Preferably, the kneading and extrusion step may be performed by uniformly mixing components using the extruder, and then conducting extrusion to obtain a thermoplastic resin composition in a pellet form. In this case, mechanical property deterioration and heat resistance deterioration may be prevented and excellent appearance quality is provided.

The thermoplastic resin composition may further include, for example, one or more selected from the group consisting of a lubricant, a heat stabilizer and a UV absorber. In this case, processability in a high-temperature molding process, thermal stability and light stability may be secured.

The lubricant may be, for example, one or more selected from the group consisting of a fatty acid amide-based compound, a montan-based wax and an olefin-based wax, preferably an olefin-based wax, more preferably polyethylene wax. In this case, molding processability and mold releasability are excellent, and noise friction resistance may be further improved.

The fatty acid amide-based compound may be, for example, at least one selected from the group consisting of stearamide, behenamide, ethylene bis(stearamide), N,N"-ethylene bis(12-hydroxystearamide), erucamide, oleamide and ethylene bis oleamide.

The montan-based wax may be, for example, montan wax, montan ester wax or a mixture thereof.

The olefin-based wax may be, for example, polyethylene wax, polypropylene wax or a mixture thereof.

The lubricant may be included in an amount of, for example, 0.05 to 1.0 parts by weight, preferably 0.1 to 0.7 parts by weight, more preferably 0.1 to 0.5 parts by weight, based on 100 parts by weight in total of the polycarbonate resin (A), the resin (B), the copolymer (C), the polyester resin (D), and the epoxy group-containing resin (E). Within these ranges, physical property balance is excellent and friction noise resistance is further improved.

The heat stabilizer may include, for example, a phenolic heat stabilizer, a phosphorus heat stabilizer or a mixture thereof, preferably may be a phenolic heat stabilizer. In this case, oxidation due to heat during an extrusion process may be prevented, and mechanical properties and heat resistance are excellent.

For example, the phenolic heat stabilizer may include one or more selected from the group consisting of N,N'-hexane-1,6-diyl-bis[3-(3,5-di-t-butyl-4-hydroxyphenyl propionamide)], pentaerythritol tetrakis[3-(3,5-di-t-butyl-4-hydroxyphenyl)propionate], N,N'-hexamethylene-bis(3,5-di-t-butyl-4-hydroxy-hydrocinnamamide), triethyleneglycol-bis[3-(3-t-butyl-5-methyl-4-hydroxyphenyl)propionate], 3,5-di-t-butyl-4-hydroxybenzylphosphonate-diethylester, 1,3,5-trimethyl-2,4,6-tris(3,5-di-t-butyl-4-hydroxybenzyl) benzene, and 1,3,5-tris(4-t-butyl-3-hydroxy-2,6-dimethylbenzyl)isocyanurate. In this case, heat resistance may be greatly improved while maintaining physical property balance at a high level.

For example, the phosphorus heat stabilizer may include one or more selected from the group consisting of triphenylphosphite, tris(nonylphenyl)phosphite, tris(2,4-di-tert-butylphenyl)phosphite, tris(2,6-di-tert-butylphenyl)phosphite, tridecylphosphite, trioctylphosphite, trioctadecylphosphite, didecylmonophenylphosphite, dioctylmonophenylphosphite, diisopropylmonophenylphosphite, monobutyldiphenylphosphite, monodecyldiphenylphosphite, monooctyldiphenylphosphite, bis(2,6-di-tert-butyl-4-methylphenyl)pentaerythritoldiphosphite, 2,2-methylenebis(4,6-di-tert-butylphenyl)octylphosphite, bis(nonylphenyl)pentaerythritoldiphosphite, bis(2,4-di-tert-butylphenyl)pentaerythritoldiphosphite, stearylpentaerythritoldiphosphite, tributylphosphate, triethylphosphate, and trimethylphosphate.

The heat stabilizer may be included in an amount of, for example, 0.05 to 1.0 parts by weight, preferably 0.1 to 0.7 parts by weight, more preferably 0.1 to 0.5 parts by weight, based on 100 parts by weight in total of the polycarbonate resin (A), the resin (B), the copolymer (C), the polyester resin (D), and the epoxy group-containing resin (E). Within these ranges, physical property balance is excellent and heat resistance is improved.

For example, the UV absorber may include one or more selected from the group consisting of a triazine-based UV absorber, a benzophenone-based UV absorber, a benzotriazole-based UV absorber, a quinolinone-based UV absorber, a benzoate-based UV absorber, a cyanoacrylate-based UV absorber, and a benzoxazole-based UV absorber, preferably a benzotriazole-based UV absorber. In this case, physical property balance may be excellent, and light resistance may be further improved.

For example, the triazine-based UV absorber may be at least one selected from the group consisting of 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,6-diphenyl-4-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropane-2-yloxy)phenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, 2,4,6-tris(2-hydroxy-3-methyl-4-(1-(2-ethoxyhexyloxy)-1-oxopropane-2-yloxy)phenyl)-1,3,5-triazine, 2,4-bis(2,4-dimethylphenyl)-6-(2-hydroxy-4-N-octyloxyphenyl)-1,3,5-triazine, and 2-(4,6-diphenyl-1,3,5-triazine-2-yl)-5-(2-(2-ethylhexanoyloxy)ethoxy)phenol.

For example, the benzophenone-based UV absorber may be at least one selected from the group consisting of 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydratebenzophenone, 2-hydroxy-4-dodecyloxybenzophenone, 2-hydroxy-4-octadecyloxy-benzophenone, 2,2"-dihydroxy-4-methoxybenzophenone, 2,2",4,4"-tetrahydroxybenzophenone, 2,2"-dihydroxy-4,4"-dimethoxybenzophenone, 2,2"-dihydroxy-4,4"-dimethoxy-5-sodiumsulfoxybenzophenone, bis(5-benzoyl-4-hydroxy-2-methoxyphenyl)methane, 2-hydroxy-4-n-dodecyloxybenzophenone, 2-hydroxy-4-methoxy-2"-carboxybenzophenone and 4,4"-bis(diethylamino)benzophenone.

For example, the benzotriazole-based UV absorber may be at least one selected from the group consisting of 2-(2"-hydroxy-5"-methylphenyl)benzotriazole, 2-2"-hydroxy-3", 2-(2"-hydroxy-3"-tert-butyl-5"-methylphenyl)benzotriazole, 2-(2"-hydroxy-5"-methylphenyl)benzotriazole, 5"-bis(α,α-dimethylbenzyl)phenyl-benzotriazole, 2-(2"-hydroxy-3",5"-di-tert-butyl-phenyl)-benzotriazole, 2-(2"-hydroxy-3"-tert-butyl-5"-methylphenyl)-5-chlorobenzotriazole, 2-(2"-hydroxy-3",5"-di-tert-butyl-phenyl)-5-chlorobenzotriazole, 2-(2"-hydroxy-3",5"-di-tert-amyl)-benzotriazole, 2-(2"-hydroxy-3",5"-di-tert-amylphenyl)-5-chlorobenzotriazole, 2-(2"-hydroxy-3"-(3",4",5",6"-tetrahydrophthalimidemethyl)-5"-methylphenyl)benzotriazole, 2-(2-hydroxy-3,5-di-tert-pentylphenyl)benzotriazole, 2-(2"-hydroxy-5"-tert-octylphenyl)benzotriazole and 2,2"-methylenebis[4-(1,1,3,3-tetramethylbutyl)-6-(2H-benzotriazole-2-yl)phenol.

For example, the indole-based UV absorber may be 2-[(1-methyl-2-phenyl-1H-indole-3-yl)methylene]propanedinitrile.

For example, the quinolinone-based UV absorber may be 4-hydroxy-3-[(phenylimino)methyl]-2 (1H)-quinolinone.

For example, the benzoate-based UV absorber may be at least one selected from the group consisting of 2,4-di-t-butylphenyl-3",5"-di-t-butyl-4"-hydroxybenzoate, 2,6-di-t-butylphenyl-3",5"-di-t-butyl-4"-hydroxybenzoate, n-hexadecyl-3,5-di-t-butyl-4-hydroxybenzoate, and n-octadecyl-3,5-di-t-butyl-4-hydroxybenzoate.

For example, the cyanoacrylate-based UV absorber may be 2"-ethylhexyl-2-cyano-3,3-diphenylacrylate, ethyl-2-cyano-3-(3",4"-methylenedioxyphenyl)-acrylate, or a mixture thereof.

The UV absorber may be included in an amount of, for example, 0.05 to 1.0 parts by weight, preferably 0.1 to 0.7 parts by weight, more preferably 0.1 to 0.5 parts by weight, based on 100 parts by weight in total of the polycarbonate resin (A), the resin (B), the copolymer (C), the polyester resin (D), and the epoxy group-containing resin (E). Within these ranges, property balance is excellent and light resistance is further improved.

In the kneading and extrusion process, the thermoplastic resin composition may optionally further include one or more additives selected from the group consisting of an antioxidant, a dye, a pigment, a colorant, a release agent, an antistatic agent, an antibacterial agent, a processing aid, a compatibilizer, a metal deactivator, a flame retardant, a smoke suppressant, an anti-drip agent, a foaming agent, a plasticizer, a reinforcing agent, a filler, a matting agent, an anti-friction agent, and an anti-wear agent, other than the aforementioned components, as needed. The additive may be included in an amount of, for example, 0.01 to 5 parts by weight, preferably 0.05 to 3 parts by weight, 0.05 to 2 parts by weight or 0.05 to 1 part by weight, based on 100 parts by weight in total of the polycarbonate resin (A), the resin (B), the copolymer (C), the polyester resin (D), and the epoxy group-containing resin (E). Within these ranges, necessary physical properties are well realized without reducing the original physical properties of the thermoplastic resin composition.

For example, as the antistatic agent, one or more selected from anionic surfactants and nonionic surfactants may be used, without being limited thereto.

For example, as the release agent, one or more selected from glycerin stearate and polyethylene tetrastearate may be used, without being limited thereto.

Molded Article

A molded article of the present invention includes the thermoplastic resin composition according to the present disclosure. In this case, mechanical properties, molding processability and heat resistance are excellent, and friction noise resistance over wide temperature and humidity ranges is excellent.

The molded article may be manufactured by a method generally used in the art. For example, using a melted kneaded material or pellets of the thermoplastic resin composition according to the present invention as a low material, an injection molding method, an injection compression molding method, an extrusion molding method, a blow molding method, a press molding method, a pressure forming method, a heat bending method, a compression molding method, a calender molding method, a rotating molding method, or the like may be applied. Here, the size and thickness of a molded article may be appropriately adjusted according to the purpose of use, and a flat plate or a curved surface shape may be used according to the purpose of use.

As a specific example, the method of manufacturing the molded article may include a step of injecting a melted kneaded material or pellets of the thermoplastic resin composition according to the present invention using an injection machine.

The molded article has excellent mechanical strength, heat resistance and friction noise resistance, thereby being suitable for application to an automobile interior material. As a specific example, the automobile interior material may be a vehicle console, a center fascia, a door trim or a garnish.

The thermoplastic resin composition of the present invention exhibits excellent mechanical strength, heat resistance and friction noise resistance, thereby being suitable for application to fields requiring a high level of emotional quality, particularly being suitable for molded articles for electric vehicle parts.

In the description of the thermoplastic resin composition, the method of preparing the same and the molded article manufactured thereby, other conditions or equipment that are not explicitly described may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in the following examples and comparative examples are as follows.

(A-1) Polycarbonate resin: Bisphenol A-type PC resin having a melt flow index (300° C., load: 1.2 kg) of 30 g/10 min, measured according to ISO 1133 (weight average molecular weight: 15,000 g/mol, intrinsic viscosity (25° C.): 1.0 dl/g)

(A-2) Polycarbonate resin: Bisphenol A-type PC resin having a melt flow index (300° C., load: 1.2 kg) of 22 g/10 min, measured according to ISO 1133 (weight average molecular weight: 10,000 g/mol, intrinsic viscosity (25° C.): 0.9 dl/g)

(B) Polyorganosiloxane-polycarbonate resin: Polyorganosiloxane-polycarbonate resin having a melt flow index (300° C., load: 1.2 kg) of 0.8 g/10 min, measured according to ISO 1133, and including 30% by weight of a polydimethylsiloxane unit (weight average molecular weight: 100,000 g/mol)

(C) Vinyl cyanide compound-conjugated diene rubber-aromatic vinyl compound copolymer: ABS resin including 10% by weight of a butadiene rubber having an average particle diameter of 1 μm; 28% by weight of acrylonitrile; and 62% by weight of styrene (weight average molecular weight: 300,000 g/mol)

(D) Polyester resin: Polybutylene terephthalate having an intrinsic viscosity (25° C.) of 1.2 dl/g (weight average molecular weight: 15,000 g/mol)

(E) Epoxy group-containing resin: Ethylene-based copolymer including 12% by weight of a glycidyl methacrylate unit, and 5% by weight of a vinyl acetate unit (weight average molecular weight: 50,000 g/mol)

(F) Impact modifier: MMA-BD-based impact modifier including a butadiene rubber and methacrylate and having a core-shell structure (EM520 manufactured by LG Chem)

Examples 1 to 5 and Comparative Examples 1 to 12

The polycarbonate resin (A-1) or the polycarbonate resin (A-2), the polyorganosiloxane-polycarbonate resin (B), the copolymer (C), the polyester resin (D), the epoxy group-containing resin (E), and the impact modifier (F) were mixed using a super mixer in contents summarized in Tables 1 and 2 below, followed by being extruded using a twin-screw extruder (screw diameter: 26 mm, L/D=40) under extrusion conditions of an extrusion temperature of 260° C. and a screw rotation speed of 250 rpm, thereby preparing pellets.

The prepared pellet-shaped thermoplastic resin composition was dried at 100° C. for 2 hours or more, and then injection-molded using an injection machine under conditions of an injection temperature of 260° C., a mold temperature of 60° C. and an injection rate of 30 mm/sec, thereby manufacturing a specimen. Manufactured specimens were allowed to stand at room temperature (20 to 26° C.) for 48 hours or more, followed by property measurement.

Test Example

The properties of the specimens manufactured by the examples and the comparative examples were measured according to the following methods, and results are summarized in Tables 3 and 4 below.

Stick-slip noise: The Ziegler SSP-04 equipment(Ziegler instrument GmbH) was used according to VDA 230-206, and a flat plate specimen of 100 mm×100 mm×30 mm in width, length and thickness was fixed on a movable fixing plate, and a flat specimen of 25 mm×50 mm×30 mm in width, length and thickness was fixed to an upper fixing plate equipped with a spring. Next, the centers of the two specimens were adjusted to coincide with each other and, in a state in which the two specimens were in contact, acceleration, impulse, frequency, friction, and fluctuation were respectively measured. The RPN (Risk Priority Number) was calculated according to Equation 2 below, and then friction noise property was evaluated according to the following criteria. A total of four conditions of a specimen-applied load and a motion velocity were as follows: (10 N, 1 mm/s); (10 N, 4 mm/s); (40 N, 1 mm/s); and (40 N, 4 mm/s).

$$RPN = \frac{2*\text{grade}_{energie\_rate} + \text{grade}_{impulse\_rate} + \text{grade}_{acceleration}}{4} \quad \text{[Equation 2]}$$

<Friction Noise Property Evaluation>

RPN 1 to 3: Good (the possibility of friction noise is very low)

RPN 4 to 5: Partially good

RPN 6 to 10: Not good

Friction noise property was measured under a total of four environmental conditions: a relative humidity of 50% and room temperature (23° C.); a relative humidity of 50% and a low temperature (−25° C.); a relative humidity of 50% and high temperature (75° C.); and a relative humidity of 90% and a medium temperature (50° C.). These were respectively expressed as stick-slip noise at room temperature; stick-slip noise at low temperature; stick-slip noise at high temperature; and stick-slip noise at medium temperature and high humidity. For reference, Tables 3 and 4 show the highest RPN grades among the friction noise values measured under the four motion conditions.

Melt flow index (g/10 min): Measured at 260° C. under a load of 5 kg for 10 minutes according to ISO 1133.

Heat distortion temperature (° C.): Measured under a pressure of 1.8 MPa according to ISO 75.

Flexural strength and flexural modulus (MPa): Flexural strength and flexural modulus were respectively measured under conditions of a specimen thickness of 4 mm, a span of 64 mm and a test rate of 2 mm/min according to ISO 178.

TABLE 1

| Classification | Examples | | | | |
|---|---|---|---|---|---|
| (% by weight) | 1 | 2 | 3 | 4 | 5 |
| (A-1) PC | 44.4 | 45 | 41 | 35 | 39 |
| (A-2) PC | — | — | — | — | — |
| (B) PDMS-PC | 30 | 30 | 30 | 40 | 30 |
| (C) ABS | 15 | 15 | 15 | 17 | 15 |
| (D) PBT | 5.6 | 5 | 6 | 3 | 10 |
| (E) Epoxy group-containing resin | 2 | 2 | 5 | 2 | 3 |
| (F) impact modifier | 3 | 3 | 3 | 3 | 3 |
| B:C weight ratio | 2.0 | 2.0 | 2.0 | 2.4 | 2.0 |
| B:D weight ratio | 5.4 | 6.0 | 5.0 | 13.3 | 3.0 |

TABLE 2

| Classification (% by weight) | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (A-1) PC | 80 | 55 | 50 | 35 | 46 | 41 | — | 11 | 52 | 24 | 28 | 40 |
| (A-2) PC | — | — | — | — | — | — | 45 | — | — | — | — | — |
| (B) PDMS-PC | — | 20 | 30 | 30 | 30 | 30 | 30 | 60 | 30 | 30 | 30 | 38 |
| (C) ABS | 15 | 15 | 15 | 15 | 15 | 15 | 15 | 15 | 4 | 32 | 19 | 15 |
| (D) PBT | — | 5 | — | 15 | 5 | 5 | 5 | 6 | 6 | 6 | 15 | 2 |
| (E) Epoxy group-containing resin | 2 | 2 | 2 | 2 | 1 | 6 | 2 | 5 | 5 | 5 | 5 | 2 |
| (F) Impact modifier | 3 | 3 | 3 | 3 | 3 | 3 | 3 | 3 | 3 | 3 | 3 | 3 |
| B:C weight ratio | — | 1.3 | 2.0 | 2.0 | 2.0 | 2.0 | 2.0 | 4.0 | 7.5 | 0.9 | 1.6 | 2.5 |
| B:D weight ratio | — | 4.0 | — | 2.0 | 6.0 | 6.0 | 6.0 | 10.0 | 5.0 | 5.0 | 2.0 | 19.0 |

TABLE 3

| Classification | | Examples | | | | |
|---|---|---|---|---|---|---|
| | | 1 | 2 | 3 | 4 | 5 |
| RPN | Room temperature 23° C. | ≤3 | ≤3 | ≤3 | ≤3 | ≤3 |
| | Low temperature −25° C. | ≤3 | ≤3 | ≤3 | ≤3 | ≤3 |
| | High temperature 75° C. | ≤3 | ≤3 | ≤3 | ≤3 | ≤3 |
| | Medium temperature and high humidity 50° C., 90 RH % | ≤3 | ≤3 | ≤3 | ≤3 | ≤3 |
| Heat distortion temperature | | 97 | 98 | 98 | 95 | 96 |
| Fluidity (MI) | | 16 | 15 | 11 | 14 | 12 |
| Flexural strength (FS) | | 80 | 80 | 78 | 78 | 79 |
| Flexural modulus (FM) | | 2,150 | 2,130 | 2,110 | 2,130 | 2,200 |

TABLE 4

| Classif. | | Comparative Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| RPN | Room temperature 23° C. | ≤6 | ≤4 | ≤3 | ≤3 | ≤3 | ≤3 | ≤4 | ≤3 | ≤3 | ≤3 | ≤3 | ≤3 |

TABLE 4-continued

| Classif. | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Low temperature −25° C. | ≤5 | ≤4 | ≤3 | ≤3 | <3 | ≤3 | ≤4 | ≤3 | ≤3 | ≤3 | ≤3 | ≤3 |
| High temperature 75° C. | ≤9 | ≤6 | ≤9 | ≤3 | ≤5 | ≤3 | ≤5 | ≤3 | ≤3 | ≤5 | ≤3 | ≤3 |
| Medium temperature and high humidity 50° C., 90 RH % | ≤4 | ≤4 | ≤3 | ≤3 | ≤3 | ≤3 | ≤4 | ≤3 | ≤3 | ≤3 | ≤3 | ≤3 |
| Heat distortion temperature | 103 | 104 | 102 | 87 | 99 | 95 | 98 | 90 | 100 | 96 | 88 | 93 |
| Fluidity (MI) | 10 | 14 | 12 | 22 | 16 | 6 | 14 | 4 | 8 | 13 | 14 | 9 |
| Flexural strength (FS) | 78 | 78 | 75 | 73 | 80 | 70 | 77 | 70 | 72 | 78 | 80 | 72 |
| Flexural modulus (FM) | 2,280 | 2,240 | 2,230 | 2,220 | 2,100 | 1,900 | 2,060 | 2,000 | 2,060 | 2,107 | 2,080 | 2,050 |

Referring to Tables 1 and 2, it was confirmed that, in the case of Examples 1 to 5 prepared according to the present invention, the friction noise property was 3 grades or less indicating excellent friction noise resistance, the heat distortion temperature was 95° C. or more indicating excellent heat resistance, the melt flow index was 11 or more indicating appropriate molding processability, the flexural strength was 78 MPa or more and the flexural modulus was 2,110 MPa or more indicating excellent flexural characteristics, under all conditions of room temperature; low temperature; high temperature; and medium temperature and high humidity.

On the other hand, it was confirmed that in the case of Comparative Examples 1 to 12 different from the present invention, the friction noise resistance, the heat resistance, the fluidity, the flexural strength and the flexural modulus were out of the ranges of the examples of the present invention.

The invention claimed is:

1. A thermoplastic resin composition, comprising:
   (A) 35 to 50% by weight of a polycarbonate resin having a melt flow index (300° C., load: 1.2 kg) of 25 to 35 g/10 min measured according to ISO 1133;
   (B) 25 to 40% by weight of a polyorganosiloxane-polycarbonate resin;
   (C) 15 to 20% by weight of a vinyl cyanide compound-conjugated diene rubber-aromatic vinyl compound copolymer;
   (D) 1 to 10% by weight of a polyester resin;
   (E) 2 to 5% by weight of an epoxy group-containing resin; and
   (F) 1 to 3.3% by weight of an impact modifier, the impact modifier comprising 40 to 60% by weight of a conjugated diene rubber and 40 to 60% by weight of a (meth)acrylate-based compound, based on a total weight of the impact modifier,
   wherein the polyorganosiloxane-polycarbonate resin (B) has a melt flow index measured according to ISO 1133 of 0.7 to 1.5 g/10 min, and a weight average molecular weight of 50,000 to 150,000 g/mol,
   wherein a weight ratio (B:C) of the resin (B) to the copolymer (C) is 2:1 to 4:1, and
   wherein a weight ratio (B:D) of the resin (B) to the resin (D) is 3:1 to 15:1.

2. The thermoplastic resin composition according to claim 1, wherein a flexural strength, measured under conditions of 23° C., a specimen thickness of 4 mm, a span of 64 mm and a test rate of 2 mm/min according to ISO 178, of the thermoplastic resin composition is 78 MPa or more.

3. The thermoplastic resin composition according to claim 1, wherein a flexural modulus, measured under conditions of 23° C., a specimen thickness of 4 mm, a span of 64 mm and a test rate of 2 mm/min according to ISO 178, of the thermoplastic resin composition is 2,110 MPa or more.

4. The thermoplastic resin composition according to claim 1, wherein a heat distortion temperature (HDT), measured under a condition of 1.8 MPa according to ISO 75, of the thermoplastic resin composition is 95° C. or more.

5. The thermoplastic resin composition according to claim 1, wherein the polycarbonate resin (A) is at least one selected from the group consisting of a linear polycarbonate resin, a branched polycarbonate resin and a polyester carbonate copolymer resin.

6. The thermoplastic resin composition according to claim 1, wherein the polycarbonate resin (A) has a weight average molecular weight of 10,000 to 30,000 g/mol.

7. The thermoplastic resin composition according to claim 1, wherein the resin (B) comprises 25 to 45% by weight of a polyorganosiloxane unit, based on a total weight of the resin (B).

8. The thermoplastic resin composition according to claim 1, wherein a conjugated diene rubber having an average particle diameter of 0.8 to 1.5 μm is present in an amount of 3 to 12% by weight, based on a total weight of the copolymer (C).

9. The thermoplastic resin composition according to claim 1, wherein the polyester resin (D) is at least one selected from the group consisting of polyethylene adipate (PEA), polybutylene succinate (PBS), polyethylene terephthalate (PET), polybutylene terephthalate (PBT), polytrimethylene terephthalate (PTT) and polyethylene naphthalate (PEN).

10. The thermoplastic resin composition according to claim 1, wherein an intrinsic viscosity, measured under a condition of a methylene chloride solvent at 25° C., of the polyester resin (D) is 1.0 to 1.5 dl/g.

11. A method of preparing a thermoplastic resin composition, the method comprising: a step of kneading and extruding (A) 35 to 50% by weight of a polycarbonate resin having a melt flow index (300° C., load: 1.2 kg) of 25 to 35 g/10 min measured according to ISO 1133, (B) 25 to 40% by weight of a polyorganosiloxane-polycarbonate resin, (C) 15 to 20% by weight of a vinyl cyanide compound-conjugated diene rubber-aromatic vinyl compound copolymer, (D) 1 to 10% by weight of a polyester resin, (E) 2 to 5% by weight of an epoxy group-containing resin at 200 to 300° C., and (F) 1 to 3.3% by weight of an impact modifier, the impact modifier comprising 40 to 60% by weight of a conjugated diene rubber and 40 to 60% by weight of a (meth)acrylate-based compound, based on a total weight of the impact modifier, wherein the polyorganosiloxane-polycarbonate resin (B) has a melt flow index (300° C., load: 1.2 kg), measured according to ISO 1133, of 0.7 to 1.5 g/10 min, and a weight average molecular weight of 50,000 to 150,000 g/mol, wherein a weight ratio (B:C) of the resin (B) to the copolymer (C) is 2:1 to 4:1, and wherein a weight ratio (B:D) of the resin (B) to the resin (D) is 3:1 to 15:1.

12. A molded article, comprising the thermoplastic resin composition according to claim 1.

\* \* \* \* \*